United States Patent
McDonagh et al.

(10) Patent No.: US 6,832,085 B1
(45) Date of Patent: Dec. 14, 2004

(54) METHOD AND APPARATUS FOR RADIO NETWORK MANAGEMENT

(75) Inventors: Brendan McDonagh, Dublin (IE); Tony Tehan, Dublin (IE); Nora Hearty, Dublin (IE); Bernadette Guinan, Dublin (IE); Shane McFadden, Dublin (IE); Steven Dagg, Dublin (IE); Bernadette Fitzsimmons, Dublin (IE); Adrian Newcombe, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/266,843

(22) Filed: Mar. 12, 1999

Related U.S. Application Data

(60) Provisional application No. 60/081,604, filed on Apr. 14, 1998.

(51) Int. Cl.[7] .................................................. H04Q 7/34
(52) U.S. Cl. ..................... 455/423; 455/425; 455/67.11
(58) Field of Search .................................. 455/423, 424, 455/445, 425, 422.1, 403, 557, 556, 531, 532, 67.11, 560, 67.13, 501, 67.14, 453

(56) References Cited

U.S. PATENT DOCUMENTS

| | | | | |
|---|---|---|---|---|
| 5,095,500 | A | * | 3/1992 | Tayloe et al. ............. 379/32.01 |
| 5,548,533 | A | * | 8/1996 | Gao et al. .................... 364/514 |
| 5,809,491 | A | * | 9/1998 | Kayalioglu et al. ........... 706/45 |
| 5,819,177 | A | * | 10/1998 | Vucetic et al. ............... 455/425 |
| 5,859,838 | A | * | 1/1999 | Soliman ...................... 370/249 |
| 5,886,984 | A | * | 3/1999 | Abu-Amara et al. ........ 370/252 |
| H1896 | H | * | 10/2000 | Hoffpauir et al. ........... 455/433 |
| 6,141,565 | A | * | 10/2000 | Feuerstein et al. .......... 455/560 |
| 6,185,439 | B1 | * | 2/2001 | Guerrero et al. ............ 455/560 |
| 6,233,449 | B1 | * | 5/2001 | Glitho et al. ................ 455/423 |
| 6,253,060 | B1 | * | 6/2001 | Komara et al. ................ 455/9 |
| 6,366,780 | B1 | * | 4/2002 | Obhan ........................ 455/453 |
| 6,442,384 | B1 | * | 8/2002 | Shah et al. .................. 455/423 |

OTHER PUBLICATIONS

"Advanced Management of Telecommunications Networks", Electrical Communication, vol. 65, No. 1, Jan. 1, 1991, pp. 52–59.*

Spaniol et al. "Management Mobiler Systeme", IT & TI Informationstechnik und Technische Informatik, vol. 38, No. 6, Dec. 1, 1996, pp. 24–30.*

"Advanced Management of Telecommunications Networks", Electrical Communication, vol. 65, No. 1, Jan. 1, 1991, pp 52–59.

Spaniol O. et al. "Management Mobiler Systeme", IT & TI Informationstechnik und Technische Informatik, vol. 38, No. 6, Dec. 1, 1996, pp 24–30.

* cited by examiner

Primary Examiner—Erika Gary

(57) ABSTRACT

The collection, processing, analysis and employment of real-time, call traffic event data in a wireless or radio telecommunications network is more effectively achieved by providing a continuous flow of real-time call traffic event data from a network element level or network level switch to an open, external processing platform over a standardized, open event interface. By continuously transferring call traffic event data to an open processing platform for processing, wherein the open processing platform is external to the network element level of network level switch, the central processing unit in the network element level or network level switch is more readily available to handle real-time critical operations. Once processed on the open, external processing platform, the call traffic event data can be used to support various network management functions to improve overall performance of the network.

24 Claims, 5 Drawing Sheets

METHOD AND APPARATUS FOR RADIO NETWORK MANAGEMENT

This application claims priority under 35 U.S.C.§§119 and/or 365 to Ser. No. 60/081,604, filed in the United States on Apr. 14, 1998; the entire content of which is hereby incorporated by reference.

FIELD OF THE INVENTION

The present invention generally relates to the field of telecommunications, including radio or wireless telecommunications. More particularly, the present invention relates to the field of telecommunications network performance monitoring and network optimization.

BACKGROUND

A simplified layout of a cellular telecommunications system 100 is depicted in FIG. 1. In this system, mobile stations M1–M10 communicate with the fixed part of a public switched telephone network (PSTN) by transmitting radio signals to, and receiving radio signals from, cellular base stations B1–B10. The cellular base stations B1–B10 are, in turn, connected to the PSTN via a Mobile Switching Center (MSC). Each base station B1–B10 transmits signals within a corresponding area, or "cell" C1–C10. Within each cell, a base station transmits to the mobile units located therein over downlink RF channels, while the mobile units transmit information to the base station over uplink RF channels.

A radio telecommunications network, of course, may consist of many systems, such as the cellular telecommunications system 100 illustrated in FIG. 1, wherein each system is handled by one or more MSCs. In order to properly control the network, as well as each of the systems which make up the network, the radio telecommunications network is generally maintained and serviced by a network operator. Typically, maintaining and servicing the network involves collecting and interpreting a large quantity of statistical data relating to network performance. Then, based on this statistical data, the network operator may adjust certain network parameters with the intention that such adjustments will improve overall network performance.

Conventionally, network operators rely on counter-based systems to gather and process the large quantity of performance data needed to maintain and service the network. FIG. 2 provides an example of a conventional, counter-based system. As illustrated in FIG. 2, the exchange level or network level switch 205 contains a number of event counters 0 ... n. For any one of these event counters 0 ... n, the human operator 215 must define a measuring program. This involves entering the appropriate commands into the switch 205, through the network operator workstation 220, which in turn, instructs the corresponding counter (or counters) to count the occurrence of a particular event over a period of time also defined by the human operator 215. Then, each time that event occurs, the switch 205 increments the corresponding counter. The type of events that might be tracked using the event counters 0 ... n include, for example, attempted handovers into a particular cell, successful handovers into a cell, attempted handovers from a cell into a neighboring cell, and successful handovers from a cell into a neighboring cell. At the end of the predefined measurement period, the switch 205 outputs the value stored in the corresponding counter to a post-processing application being executed in the external workstation 220. The post-processing application then converts the event information into a user-friendly format, such as a report or graph, for the human operator 215. The human operator 215 may then alter or update the configuration of the switch 205 based on the information provided by the post-processing application.

Conventional systems, such as the system illustrated in FIG. 2, suffer from a number of drawbacks. First, the human operator must generally wait a relatively long period of time (e.g., a period of time equal to the predefined measurement period, plus a period of time required by the post-processor to process the event data) to obtain processed statistical information representing network performance. Then, yet additional time is required for the human operator to interpret the processed, network performance information. Because of the delays associated with collecting, processing and interpreting the network performance data, it is difficult to make rapid decisions regarding adjustments to the switch configuration so as to quickly enhance network performance. Second, a significant amount of processing is performed by the switch itself. However, the switch is generally a very expensive network component which is designed to handle critical switch operations, not data gathering or statistical analysis. Because the collection of event data represents a large processing load, maintaining and controlling the various event counters in the switch may significantly impact the switch's ability to perform the required critical switch operations. Third, each of the various systems which make up the radio telecommunications network may be designed by, and include components manufactured by, different vendors, wherein each employs its own proprietary format. As such, it is difficult to design post-processing applications that are universally compatible with each system in the network. In addition, this flaw also makes it difficult to build post-processing applications that support automatic processing and analysis of performance statistics, feedback and automatic switch reconfiguration. Accordingly, it would be desirable to provide network system architectures and methods that more effectively and efficiently provide radio telecommunications network management.

SUMMARY

The present invention provides an efficient and effective radio network management architecture and method for collecting, processing, analyzing and employing key network performance indicators, wherein the network performance indicators involve call event-based data rather than counter-based data. As one skilled in the art will readily appreciate, every call associated with the network involves a sequence of defined elements known as call events, for example, registration, handover, page responses, access, and many others. Unlike conventional systems which, as stated above, use the exchange level or network level switch to count exchange or network level events, and then transfer the count data to an external workstation for post-processing and analysis by a human operator, the present invention transfers detailed event information relating to each call, on the occurrence of the event, to an "open" platform (i.e., one that is compatible with multiple computer systems) for real-time or near real-time processing. Then, based on the processed call event data, the present invention provides real-time or near real-time analysis of the processed call event data and automatic network (e.g., switch) optimization through feedback control for critical operations. For non-critical operations, the present invention supports additional post-processing and display of such data for the human operator. The processing of non-critical operations data, however, is accomplished on hardware that is physically separated from the switch so that the processing of such data does not inhibit, in any way, the switch's ability to perform critical operations.

Accordingly, it is an object of the present invention to provide a radio network management capability that reduces the time required to interpret network performance indicators.

It is another object of the present invention to provide a radio network management capability that can more rapidly identify network problems based on interpreted network performance indicators.

It is still another object of the present invention to provide a radio network management capability that can provide real-time or near real-time feedback control for the purpose of taking corrective action, such as, switch reconfiguration, to mitigate problems which may degrade network performance.

It is yet another object of the present invention to provide a radio network management capability that improves network quality of service.

It is further another object of the present invention to provide a radio network management capability that increases network capacity, particularly processing capacity.

In accordance with an exemplary embodiment of the present invention, the above-identified, and other objects are achieved with a network node that includes means for continuously receiving call traffic event data from a second network node, where the call traffic event data relates to a particular call traffic event, and where the second network node interfaces with and is independent of the first network node. In addition, the network node includes means for processing the continuously received call traffic event data relating to the call traffic event.

In accordance with another exemplary embodiment of the present invention, the above-identified, and other objects are achieved by a radio telecommunications network capable of monitoring and adjusting network performance based on call traffic event based data. The network includes a network element level switch and a network element level network management node connected to the network element level switch. Furthermore, the network element level network management node contains means for continuously receiving call traffic event data, relating to a particular call traffic event, from the network element level switch, and means for continuously processing the continuously received call traffic event data.

In accordance with yet another exemplary embodiment of the present invention, the above-identified and other objects are achieved by a call traffic event based network performance monitoring system. The system includes a first plurality of network elements, where each comprises a network element level switch. In addition, the system includes a plurality of network element level network management nodes. Through a standardized, open interface, each of the plurality of network element level network management nodes is connected to a corresponding one of the first plurality of network elements. Furthermore, each of the plurality of network element level network management nodes comprises means for continuously receiving call traffic event data from the corresponding network element, and means for processing the continuously received call traffic event data. The system also includes a network level network management node connected to each of the plurality of network element level network management nodes through the standardized, open interface. The network level network management node, in turn, comprises means for receiving processed call traffic event data from each network element level network management node, a measurement system for deriving network level statistical information based on the processed call traffic event data received from each network element level network management node, and an expert system for analyzing the derived network level statistical information.

In accordance with still another exemplary embodiment of the present invention, the above-identified and other objects are achieved by a call traffic event based network performance monitoring method. The method includes steps for detecting a call traffic data event. Thereafter, real-time call traffic event data is continuously forwarded from a network element level switch to a corresponding network element level network management node, where the call traffic event data is related to the detected call traffic event. The method also includes continuously processing the real-time call traffic event data, in the network element level network manager, for purposes of monitoring network performance.

BRIEF DESCRIPTION OF THE DRAWINGS

The objects and advantages of the invention will be understood by reading the following detailed description in conjunction with the drawings in which.

DETAILED DESCRIPTION

The present invention involves the collection, processing, analysis and employment of real-time, call traffic event data in a wireless or radio telecommunications network. More specifically, the present invention involves the continuous flow of real-time call traffic event data from a network element level or network level switch to an open, external processing platform, over a standardized, open event interface, using, for example, a Transmission Control Protocol/Internet Protocol (TCP/IP) based communications link. By continuously transferring call traffic event data to an open processing platform that is external to the network element level or network level switch for processing, the central processing unit (CPU) in the switch is more readily available to handle real-time critical operations. Once processed, the call traffic event data can be used to support various network management functions, such as, network diagnostics and network and/or switch reconfiguration.

Figure 3:
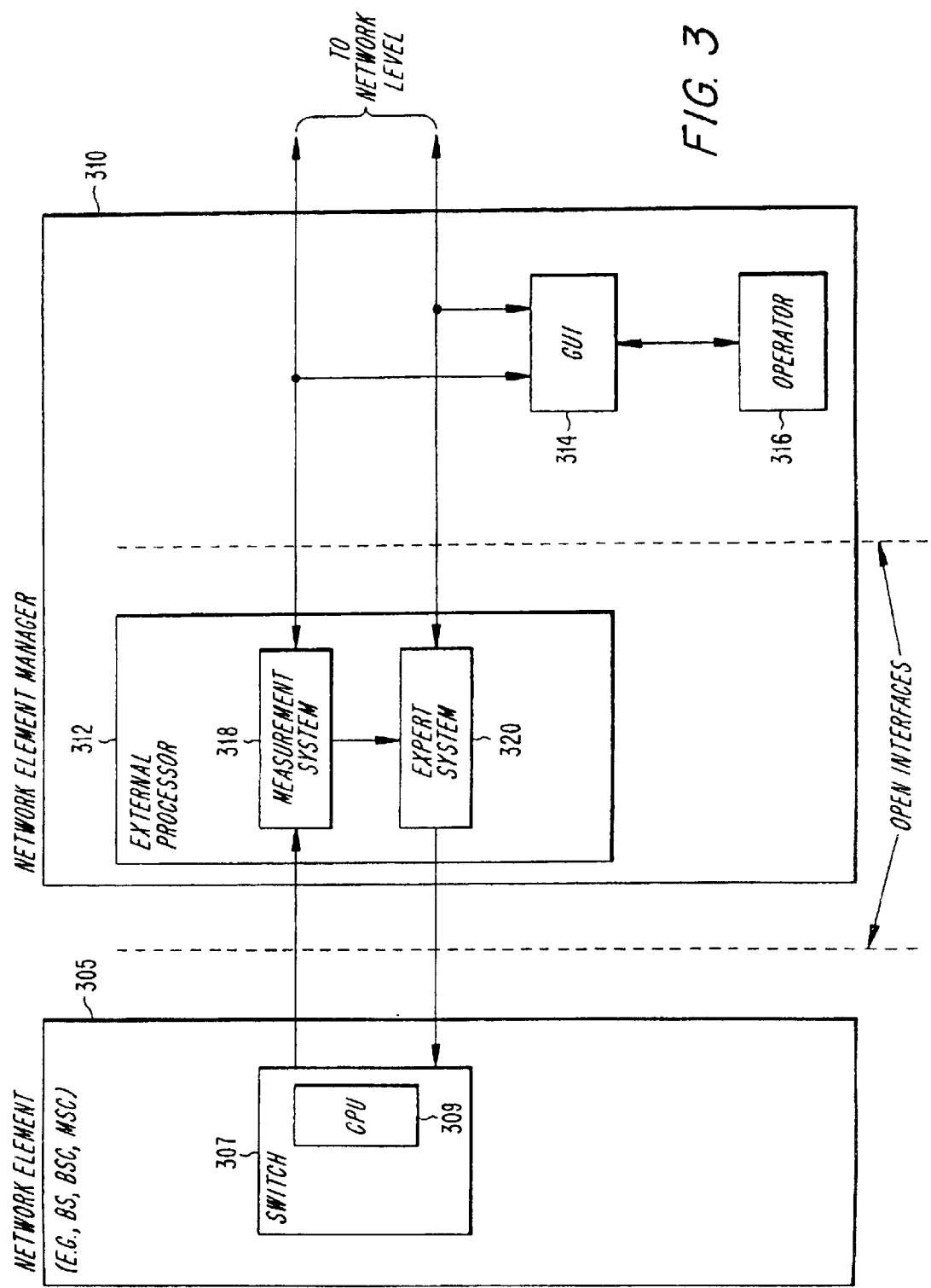
FIG. 3 depicts a network element level architecture in accordance with an exemplary embodiment of the present invention.

FIG. 3 illustrates a network element level architecture in accordance with an exemplary embodiment of the present invention. As shown, the network element level architecture includes a network element 305 and a network element manager 310, wherein the network element 305 and the network element manager 310 communicate with each other over an open event interface using, for example, the TCP/IP.

Figure 1:
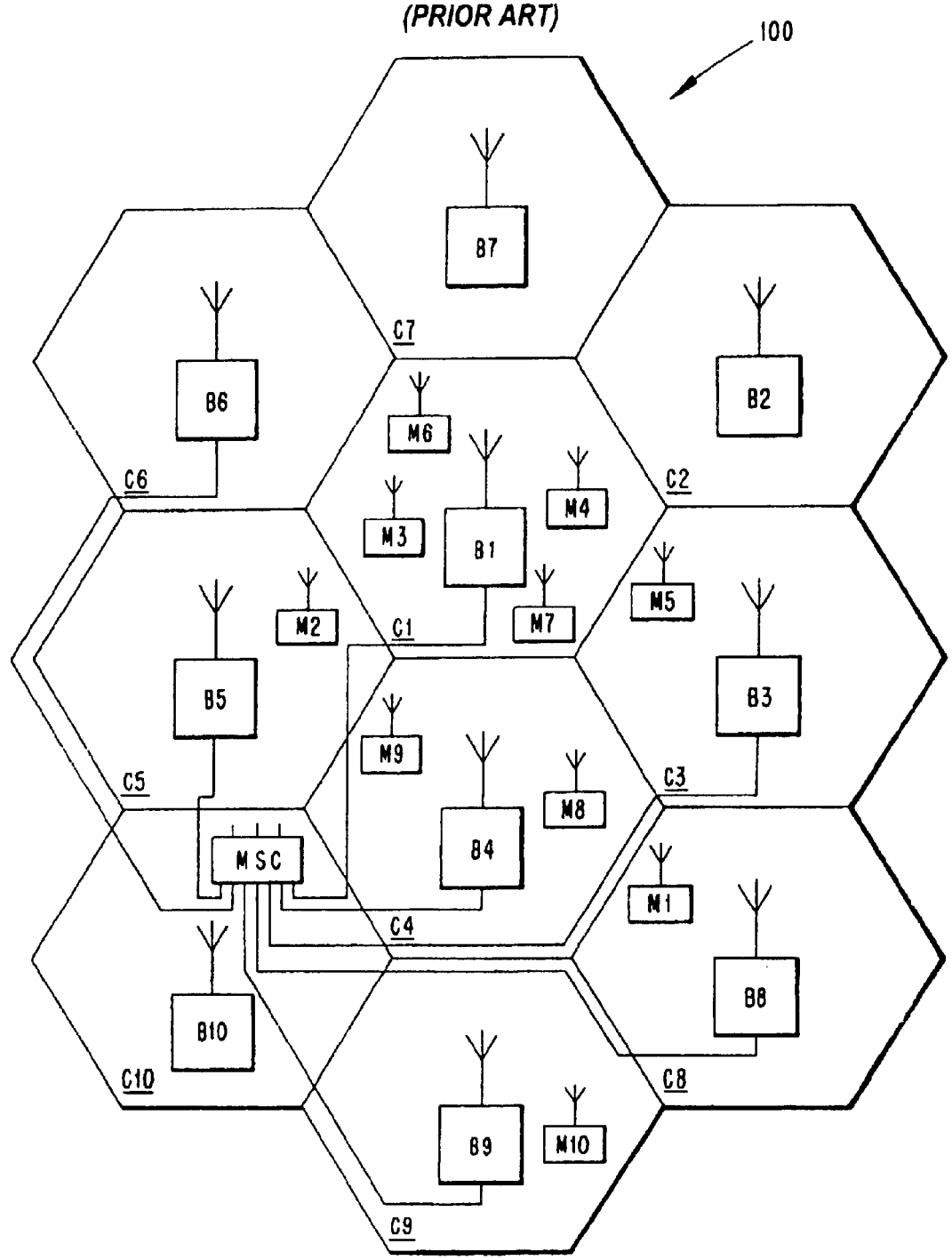
FIG. 1 depicts a conventional cellular telecommunications system in which the present invention present invention can be utilized.
Figure 2:
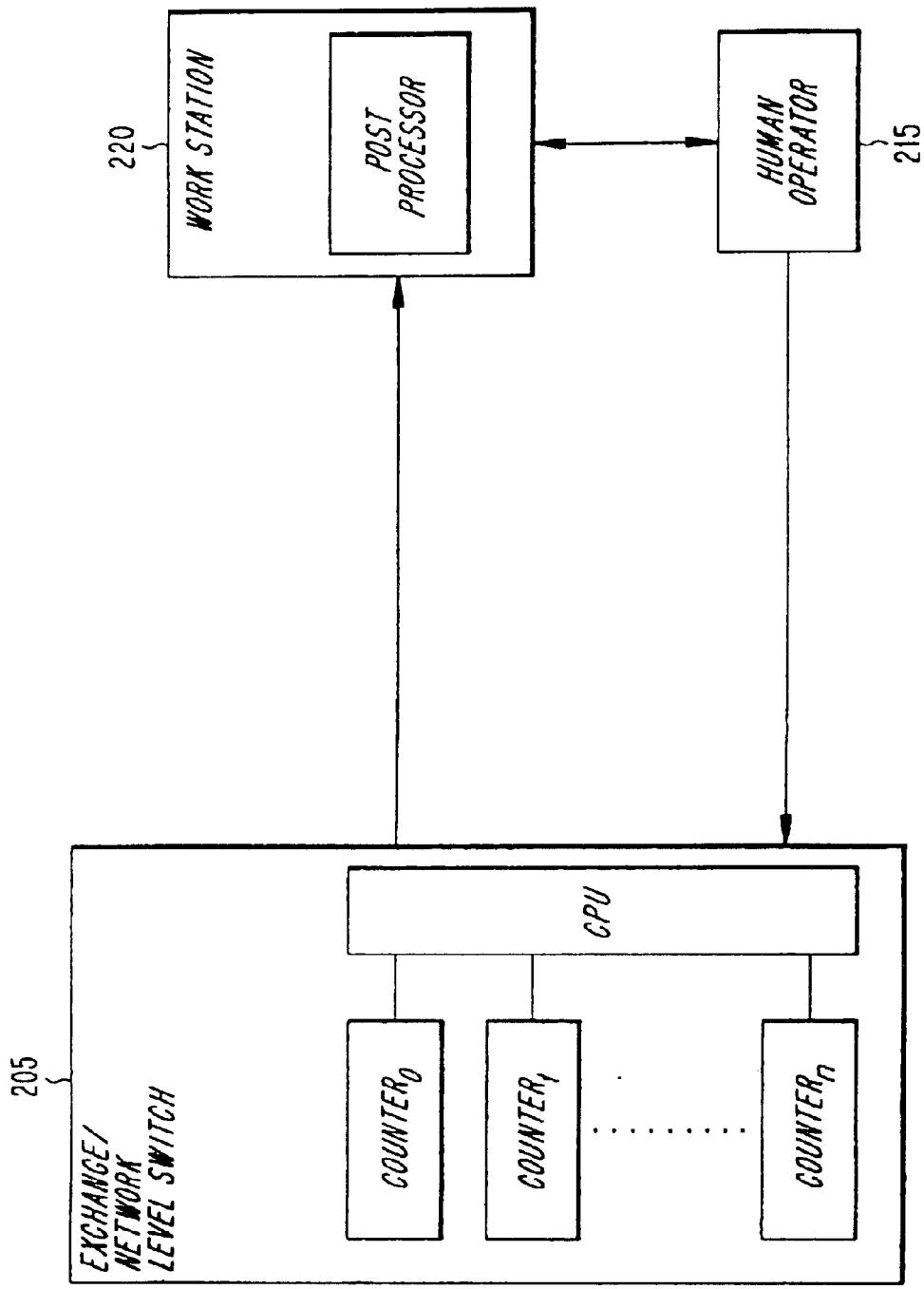
FIG. 2 depicts a conventional counter-based system for obtaining radio network management data.

The network element 305 represents any one of a number of common network element level nodes, such as, a base station (or base transceiver station), a base station controller, or a mobile switching center. The network element 305 contains, among other components, a switch 307, which in turn include a CPU 309. However, unlike the switch 205 illustrated in FIG. 2, the switch 307 need not maintain the event counters 0 . . . n, since the present invention is call traffic event based, rather than counter-based.

The network element manager 310, as illustrated in FIG. 3, includes an external processor 312 and a graphical user interface (GUI) 314, which provides applications to support the interface between the external processor 312 and a network element level network operator 316. The external processor 312 further comprises a measurement system 318 and an expert system 320.

In general, the exemplary embodiment of the present invention illustrated in FIG. 3 provides for the processing of real-time call traffic event data on an open platform (i.e., the external processor 312) independent of the CPU 309 associated with network element switch 307. More specifically, the network element 305, through or under the direction of the CPU 309, continuously forwards call traffic event data to the measurement system 318 located in the external processor 312, over the open event interface located therebetween. The measurement system 318, as one skilled in the art will readily appreciate, is a software module that has been implemented using standard programming techniques. The measurement system 318, upon receiving the call traffic event data, may store the data in an unprocessed manner in a corresponding database (not illustrated) and/or the measurement system 318 may process the data in real or near real-time, wherein such processing may involve deriving statistical information relating to the corresponding call traffic event. The statistical information generated by the measurement system 318 is then passed to the expert system 320, the GUI 314, or various network level nodes, as indicated, over an open interface. It is important to note that because the present invention employs open interfaces, the statistical information generated by the measurement system 318 may bi-pass to or accessed by applications, other than those associated wit the GUI 314, created by third-party vendors. Other tasks which the measurement system 318 performs include maintaining a continuous connection with the switch 307 over which it is to receive the call traffic event data; formatting the received call traffic event data into a suitable form for manipulation; filtering data not required to derive the desired statistical information; maintaining a list of users which are to receive the derived statistical information; sending the derived statistical information to these interested users; and maintaining certain timing processes to control when the derived statistical information is to be sent.

The expert system 320, in turn, analyzes the statistical information received from the measurement system 318, and based thereon, performs various network management tasks including automated network diagnostics and network or network switch reconfiguration, wherein the expert system 320 may execute or implement these tasks via a feedback loop to the network element 305 over the open interface.

The GUI 314, on the other hand, may be used to present or display network performance information based on the statistical information it receives from the measurement system 318, and/or the expert system 320. The network operator 316 may then use the displayed data to make and/or implement additional corrective actions so as to improve the performance of the network or the network element. Any such corrective action might be implemented by the operator 316 through a feedback loop over the various open interfaces as illustrated in FIG. 3. However, it will be understood that the operator 316 might, in the alternative, implement corrective actions using applications other than those associated with the GUI, and/or the feedback loop illustrated in FIG. 3.

Figure 4:
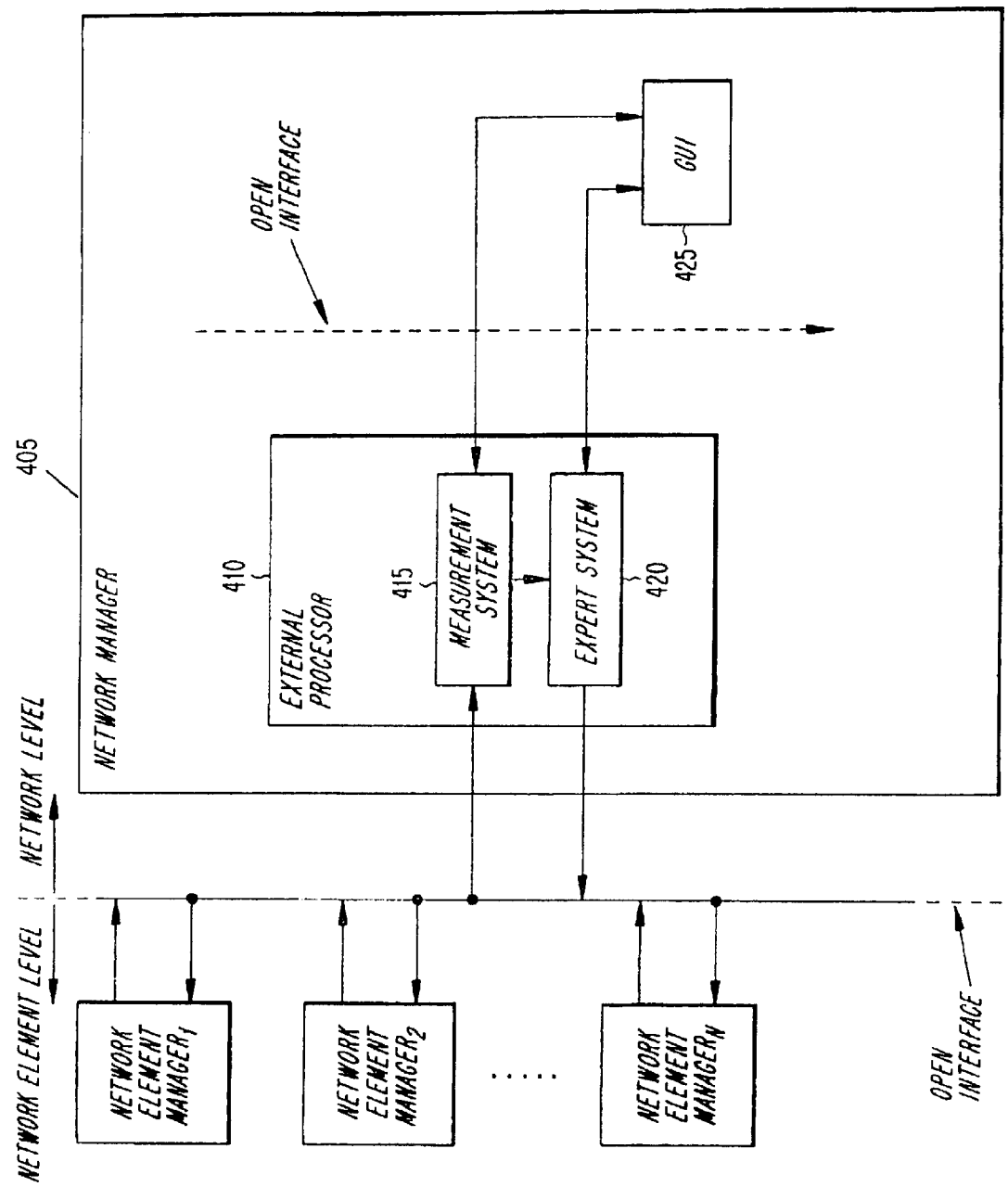
FIG. 4 illustrates a network level architecture in accordance with an exemplary embodiment of the present invention.

FIG. 4 illustrates a network level architecture in accordance with a second exemplary embodiment of the present invention. In accordance with this second exemplary embodiment, the network element level architecture illustrated in FIG. 3 is extended beyond the network element level to include the network level, wherein a network manager 405 at the network level, communicates with multiple network element managers 1 . . . N over an open interface, as shown, and wherein each of the network element level managers 1 . . . N are configured similarly to the network element manger 310 illustrated in FIG. 3. At the network level, the network manager 405 contains an external processor 410, which in turn, includes a measurement system 415 and an expert system 420. The network level measurement system 415 collects network element level statistical information from the measurement system 318 in each of the various network element managers 1 . . . N, over an open interface, as shown. Then the network level measurement system 415 may store the received network element level statistical information in a corresponding database at the network level (not illustrated), or the like, and/or the network level measurement system 415 may derive network level statistical information.

Network level statistical information derived by the network level measurement system 415 is then forwarded to the network level expert system 420 and/or the network level GUI 425. As stated previously, because the present invention employs open interfaces, the statistical information generated, in this instance, by network level measurement system 415 may be passed to or accessed by third-party vendor applications. Based on an analysis of the network level statistical information, the network level expert system 420 can, if necessary, optimize the network by implementing network level or network element level configuration changes so as to improve overall network performance, for example, implementing frequency changes that affect multiple MSCs. However, in order to implement these configuration changes, the network level expert system 420 must generally request support to do so through the various network element level expert systems 320. Like the network element level network manager 310, the network level network manager 405 also includes, a network level operator 430 and a GUI 425, wherein the GUI 425 communicates with the measurement system 415 and the expert system 420 over an open interface, and wherein the GUI 425 provides a substantially similar function as the GUI 314 illustrated in FIG. 3.

Figure 5:
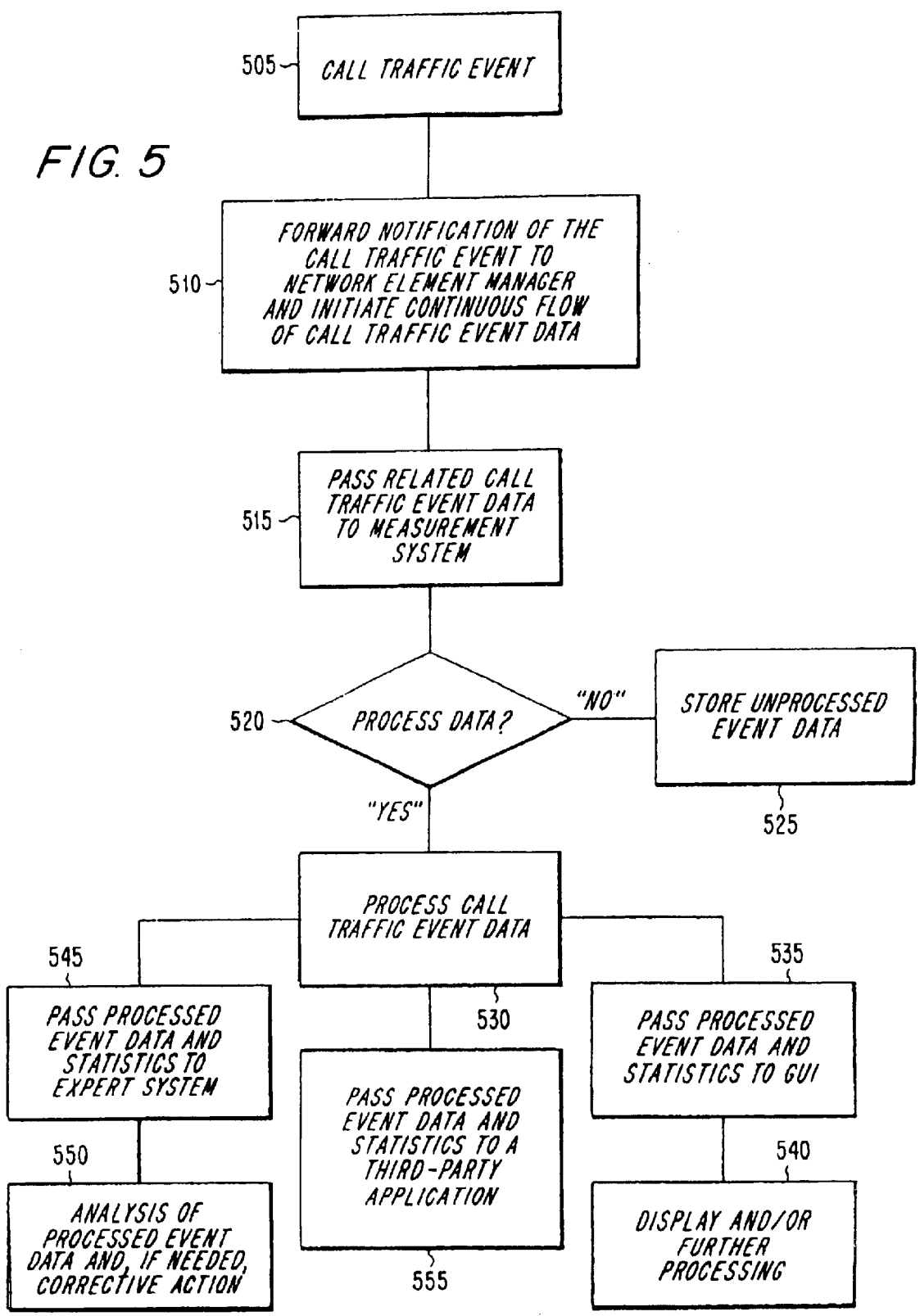
FIG. 5 is a block diagram illustrating an exemplary embodiment technique for accomplishing the present invention.

FIG. 5 illustrates, in greater detail, an exemplary process for accomplishing the present invention described above and illustrated in FIG. 3. As previously stated, each call in a radio telecommunications network comprises a sequence of defined elements known as call events, for example, registration, handover, page response, access and others. Initially, the process illustrated in FIG. 5 is triggered by the occurrence of a particular call traffic event, in accordance with procedural step 505. A notification of the occurrence of the call traffic event is then forwarded from the corresponding network element to the network element manager, as illustrated in procedural step 510, over an open event interface.

In addition to the call traffic event notification, unprocessed call traffic event data relating to that call traffic event begins flowing from the network element to the network element manager. In the case of a handover event, the unprocessed call traffic event data may include, for example, a timestamp, a mobile subscriber number, a serving cell pointer, a serving voice channel time slot, a serving channel number, a candidate cell pointer, a candidate voice channel time slot, a candidate channel number and/or a serving cell type. The unprocessed call traffic event data is then passed to the measurement system, in accordance with procedural step 515. At this juncture, a decision is made as to whether the unprocessed call traffic event data is to be stored, for future post-processing and analysis, or whether it is to be processed immediately, in real or near real-time, in accordance with decision step 520. If a determination is made to not process the event data immediately, in accordance with the 'NO' path out of decision step 520, the unprocessed call traffic-event data may be stored, for example, in a database, for post-processing at a later time, in accordance with procedural step 525. However, if a determination is made to process the event data immediately, in accordance with the 'YES' path out of decision step 520, the measurement system will, based on the unprocessed call traffic event data, calculate the desired statistical information, in accordance with procedural step 530. It will be understood, however, that it is possible to both store unprocessed call traffic event data in a database in accordance with procedural step 525 and calculate statistical information in accordance with procedural step 530.

At this point, the statistical information derived by the measurement system may be passed on to a corresponding GUI, over an open interface, as shown in procedural step 535. Then, applications being executed at the GUI may, for instance, display the statistical information for the network operator, or the applications being executed at the GUI may further process the statistical information, in accordance with procedural step 540. As previously stated, the network operator may use the information presented by the GUI to implement changes to the network configuration in order to improve network performance. Furthermore, the network operator may or may not implement the changes using the applications associated with the GUI.

The statistical information derived by the measurement system may also be passed to a network element level expert system, as indicated by procedural step 545. The network element level expert system may then use the statistical information to analyze the performance of the network element, including the network element switch. Based on this analysis, the expert system may decide to implement corrective actions to improve performance, as indicated by procedural step 550. For example, the expert system may provide automatic network optimization through reconfiguration of the network or network element switch.

It will be understood that from time to time, an operator may want to collect and process call traffic event data relating to certain call traffic events more so than other call traffic events. Accordingly, the process illustrated in FIG. 5 might include a feature whereby the operator has the ability to select only those call traffic events for which data collection and processing is desired. Similarly, the process might also include a feature whereby the operator has the ability to specify the type of data to be collected for a given call traffic event. For example, it was stated above that call traffic event data relating to a handover event might include a timestamp, a mobile subscriber number, a serving cell pointer, a serving voice channel time slot, a serving channel number, a candidate cell pointer, a candidate voice channel time slot, a candidate channel number and/or a serving cell type. In accordance with this added feature, the operator would be able to select any one or more of these call traffic event data types for processing.

It will also be understood that the statistical information derived by the measurement system may also be passed to or accessed by applications created by third-party vendors, as illustrated in step 555 of FIG. 5. This is made possible by the present inventions use of open interfaces.

In accordance with one aspect of the present invention, real or near real-time monitoring of telephone services in a radio based telecommunications system is provided. The network element level and network level architectures described above with reference to FIG. 3 and FIG. 4, and in particular, the external processing capability provided by these architectures, permits various applications at the network element level and/or the network level to subscribe to real-time call traffic event data. An example of one such application for utilizing this real-time call traffic event data involves the calculation or derivation of statistical information, for instance, by the measurement system 318 in the network element manager 310. Accordingly, statistical information pertaining to a particular call event, and pertaining to network performance in general, is immediately available for the purpose of continuous and/or periodic display of network status, or for further processing. Other applications involve analysis of the statistical information by the expert system 320, to support such functions as automatic optimization of the network element 305, or the switch 307 contained therein.

To clarify this capability, the following example is considered. A network operator has a customer care center for its North American cellular network in New York. The center has links to all network element managers across the country through open, standardized interfaces. One of the customer care products used in the center might be an application for real-time monitoring of telephony services. A subscriber then rings the center to complain about the service quality he or she is receiving. The customer care representative then asks for and enters into the real-time monitoring application being executed by GUI, the subscribers identification number. This application then subscribes in real-time to all call traffic events in the network that contain this subscriber identification number. This is done through a subscription mechanism to the network element manager across the country. The application may also fetch historical information relating to that subscriber identification number. All events in the network are now routed to this application in real-time. The events are then analyzed and the service quality associated with that subscriber is then presented.

In accordance with another aspect of the present invention, the network element level and the network level architectures illustrated in FIGS. 3 and 4, particularly the open event interface facilitating the communication link between the network element 305 and the network element manager 310, provide a clear separation of real-time critical processes and real-time non-critical processes. A real-time critical process might typically be characterized as any process relating to the generation of revenue for the telephony service provider. Such processes may include, for example, call handling, call delivery and billing. In contrast, real-time non-critical processes include, for example, operation and maintenance processes. Although call traffic event data is typically generated by both critical and non-critical processes, the collection of call traffic event data and the processing thereof, though important, is generally considered to be a non-critical process. By separating the real-time non-critical and real-time critical processes, the real-time non-critical processes, such as the operations and maintenance processes that utilize the call traffic event data, can be handled in real-time, but on an independent platform (e.g., the external processor 312 that is physically separated from the switch 307). Consequently, the processing load on the platform handling the real-time critical processes (e.g., the CPU 309 in the switch 307 in the network element 305) should be significantly reduced. In fact, it is the separation of the critical and non-critical process that ensures real-time processing. Furthermore, processing real-time non-critical and real-time critical processes on different platforms should also significantly reduce operating costs as the non-critical processes are not being executed using special, customized and substantially expensive processors.

Those skilled in the art will appreciate that conventional radio telecommunications networks employ systems made by different manufactures and in accordance with different standards, such as the Digital-Advanced Mobile Phone System (D-AMPS), the Global System for Mobile Communications (GSM) and the Japanese Digital System (PDC). Therefore, in accordance with yet another aspect of the present invention, these different systems, technologies and standards are bridged through the use of an open (i.e., published) interface. More specifically, the interface that is employed between the network element 305, the network element level network manager 310 (including the measurement system 318 and the expert system 320), the GUI 314, and the network level network manager 405, in accordance with exemplary embodiments of the present invention is a high capacity, real-time, standardized open interface. An example of such an interface is the Common Object Request Broker Architecture (i.e., CORBA) interface. Furthermore, since most radio telecommunications systems provide substantially similar end-user services, a set of common call events is to be created, so as to provide a foundation for the common interface. The use of a common, open interface, permits multi-vendor capability with respect to the development of applications at either the network element level or the network level. It also permits the reuse of the same applications among systems that employ different standards.

The invention has been described with reference to exemplary embodiments. However, it will be readily apparent to those skilled in the art that it is possible to embody the invention in specific forms other than those described above. This may be done without departing from the spirit of the invention. The exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A radio telecommunications network capable of monitoring and adjusting network performance based on call traffic event based data, said network comprising;

a network element level switch;

a network element level network management node connected to said network element level switch, the network element level network management node comprising:

means for continuously receiving call traffic event data, relating to particular call traffic event, from said network element level switch;

a measurement system for deriving statistical information relating to the call traffic event, based on the continuously received call traffic event data;

means for forwarding continuously processed traffic event data to a network level network management node, and an expert system connected to said measurement system, said expert system comprising:

means for analyzing the statistical information derived by said measurement system, means for analyzing network performance based on the analysis of the statistical information derived by said measurement system, means for determining whether corrective action is needed based on the network performance; and means for implementing corrective action through a feedback loop between the network element level network management node and a network element.

2. The network of claim 1, wherein corrective action includes automatic reconfiguration of said radio telecommunications network.

3. The network of claim 1, wherein corrective action includes automatic reconfiguration of said network element level switch.

4. The network of claim 1, wherein said network element level network management node further comprises:

a graphical user interface connected to said means for continuously processing the continuously received call traffic event data.

5. The network of claim 4, wherein said graphical user interface comprises:

means for displaying the statistical information relating to the call traffic event for a network element level network operator; and means for implementing corrective action, as determined by the network element level network operator, through a feedback loop between said network element level network management node and said network element level switch.

6. The network of claim 4, wherein said graphical user interface comprises:

means for further processing the statistical information relating to the call traffic event.

7. The network of claim 1, wherein said network element level switch comprises:

means for processing real-time critical operations.

8. The network of claim 7, wherein the call traffic event data processed by said network element level network management node relates to non-critical network operations.

9. The network of claim 1, wherein said network element level switch is a network node selected from a group of network nodes consisting of a base station, a base station transceiver station, a base station controller, and a mobile switching center.

10. The system of claim 1 further comprising:

means for processing network level statistical information over a standardized, open interface; and means for further processing the network level statistical information using a third party vendor application.

11. The system of claim 10, wherein the standardized, open interface is a Common Object Request Broker Architecture (CORBA) interface.

12. In a radio telecommunications network, a call traffic event based network performance monitoring system comprising:

a first plurality of network elements, each comprising a network element level switch;

a plurality of network element level network management nodes, wherein each of said plurality of network element level network management nodes is connected to a corresponding one of said first plurality of network elements through a standardized, open interface, and wherein each of said plurality of network element level network management nodes comprises:
  means for continuously receiving call traffic event data from the corresponding one of said first plurality of network elements, and
  means for processing the continuously received call traffic event data; and
a network level network management node connected to each of said plurality of network element level network management nodes through the standardized, open interface, wherein said network level network management node comprises:
  means for receiving processed call traffic event data from each of said plurality of network element level network management nodes;
  a measurement system for deriving network level statistical information based on the processed call traffic event data received from each of said plurality of network element level network management nodes;
  an expert system for analyzing the derived network level statistical information;
  means for transferring the derived network level statistical information from said measurement system to said expert system over a standardized, open interface; and
  means for determining whether corrective actions are to be taken to improve network performance, based on the analysis of the derived network level statistical information.

13. The system of claim 12, wherein the network element level switch in each of said plurality of network elements comprises a central processing unit for processing data relating to real-time critical operations.

14. The system of claim 12, wherein said means for processing the continuously received call traffic event data in each of said plurality of network element level network management nodes comprises:
  a measurement system for deriving network element level statistical information relating to the call traffic event data which is being continuously received from the corresponding one of said plurality of network elements.

15. The system of claim 12, wherein said network level network management node further comprises:
  means for implementing the corrective actions through a feedback loop over the standardized, open interface between said network level network management node and each of said network element level network management nodes.

16. In a radio telecommunications network, a call traffic event based network performance monitoring method comprising the steps of:
  detecting a call traffic event;
  continuously forwarding real-time call traffic event data, relating to the detected call traffic event, from a plurality of network element level management nodes to a corresponding network level network management node;
  continuously processing, in the network level network management node, the real-time call traffic event data for purposes of monitoring network performance;
  analyzing the processed call traffic event data;
  determining whether corrective steps are to be taken to improve network performance, based on the analysis of the processed call traffic event data; and
  implementing corrective actions to improve network performance through feedback loop between the plurality of network element level management nodes and a corresponding network level network management node, if it is determined that corrective steps are to be taken to improve network performance, based on the analysis of the processed call traffic event data.

17. The method of claim 16, wherein said step of determining whether corrective steps are to be taken to improve network performance, based on the analysis of the processed call traffic event data, comprises the steps of:
  determining whether to reconfigure the radio telecommunications network.

18. The method of claim 17, wherein said step of determining whether to reconfigure the radio telecommunications network comprises:
  determining whether to reconfigure one of the plurality of network element management nodes.

19. The method of claim 18, wherein said step of determining whether to reconfigure one of the plurality of network element management nodes comprises the step of:
  determining whether to reconfigure a network element switch.

20. The method of claim 16 further comprising the step of:
  in one of the plurality of network element level management nodes, determining whether the real-time call traffic event data being continuously received from the network element is to be stored prior to processing; and
  if it is determined that the real-time call traffic event data is to be stored prior to processing, then storing the call traffic event data in one or more corresponding records in a database.

21. The method of claim 16, wherein said step of processing the real-time call traffic event data comprises the step of:
  deriving statistical information based on the continuously received, real-time call traffic event data.

22. The method of claim 16, further comprising the step of:
  displaying the processed real-time call traffic event data for a network element level network operator.

23. The method of claim 22 further comprising the step of:
  implementing a corrective action to improve network performance, as determined by the network element level network operator, through a feedback loop between a network element and one of the plurality of network element level network.

24. The method of claim 16 further comprising the step of:
  forwarding the continuously processed, real-time call traffic event data to a third party vendor application over a standardized, open interface.

* * * * *